O. P. YOUNGSTROM.
AUTOMATIC WEIGHING SCALE AND REGISTER.
APPLICATION FILED DEC. 12, 1916.

1,250,750.

Patented Dec. 18, 1917.
5 SHEETS—SHEET 1.

UNITED STATES PATENT OFFICE.

OSCAR P. YOUNGSTROM, OF FREDONIA, KANSAS.

AUTOMATIC WEIGHING-SCALE AND REGISTER.

1,250,750.   Specification of Letters Patent.   Patented Dec. 18, 1917.

Application filed December 12, 1916. Serial No. 136,498.

*To all whom it may concern:*

Be it known that I, OSCAR P. YOUNGSTROM, a citizen of the United States, residing at Fredonia, in the county of Wilson and State of Kansas, have invented certain new and useful Improvements in Automatic Weighing-Scales and Registers, of which the following is a specification.

The invention has for an object to provide a scale especially adapted to weigh and record the weight and number of articles, bundles, or batches of material deposited thereon and removed, or passing thereover in transit from one point to another, and is especially adapted in the present instance to use in weighing bales of hay as delivered from a baling machine. It is an important object of the invention to present a compact device of this character which may be readily set up in any desired location in the path of moving articles or material to be weighed, as, at the discharge end of a baling machine, or in the path of other articles or material to be weighed. It is an important object of the invention to provide a means operable by engagement with material being weighed to cause proper operation of the device, so that no special operating means will be required. A further important aim is to provide a scale mechanism of a very compact form suitable for the uses involved. Another aim is to provide a very desirable form of weight recording device operable in conjunction with the parts of my invention.

It is an especially important object of the invention to give a construction of weighing mechanism and scale which will be free from excessive variations under the effect of irregular movement of the materials to be weighed in being introduced upon the scale and removed therefrom. It is a related object to obviate movement of the scale to record the weight of more than one article, even though another be partly engaged upon the scale, in a situation where articles are delivered thereto in close succession. Another important aim is to provide means whereby when articles being weighed are moved by pressure of following articles thereupon, means in the device will cause separation of the article being weighed from others before it and following; and an additional aim is to provide means to cause the recording device to operate correctly during such interval of separation.

The device is adaptable to use in a recording scale such as illustrated in my co-pending application #83,305, although registering devices only are shown herewith.

Additional objects, advantages and features of invention will appear from the construction, arrangement, and combination of parts hereinafter described and shown in the drawings, wherein.

There is illustrated a scale comprising a suitable framing 10 including side stringers 11 carrying fittings 12 in which the platform levers 13 are mounted in a familiar way, the platform levers being two in number, each comprising suitable steel yoke members having their end portions 14 disposed in parallel relation and mounted in the fittings 12. The inner parts of the levers are offset so that they lie close to each other and overlapped, adjacent one side of the frame 10. The levers project beyond the fittings 12, and support at their extremities in the familiar way, a base platform 15 upon which there is supported by means of rollers 16 a sliding platform 17, to be subsequently described. The levers 13 are formed from rolled sheet steel, in one piece, bent near the middle to form the narrow bight 20, within which respective pendant links 21 are mounted, by means of the usual knife edge construction 22, the lower ends of the links connecting with a registering mechanism to be described.

Figure 1:
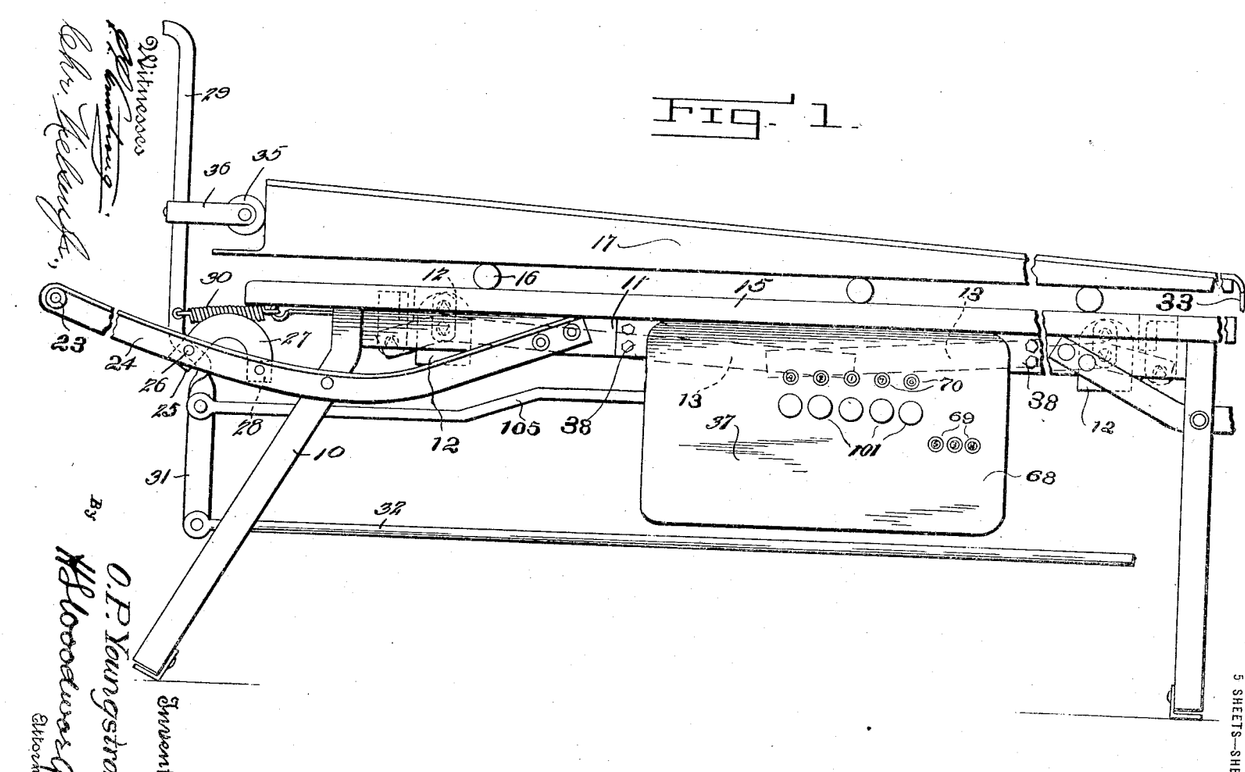
Figure 1 is a side elevation of a scale and registering mechanism constructed in accordance with my invention.
Figures 2, 3:
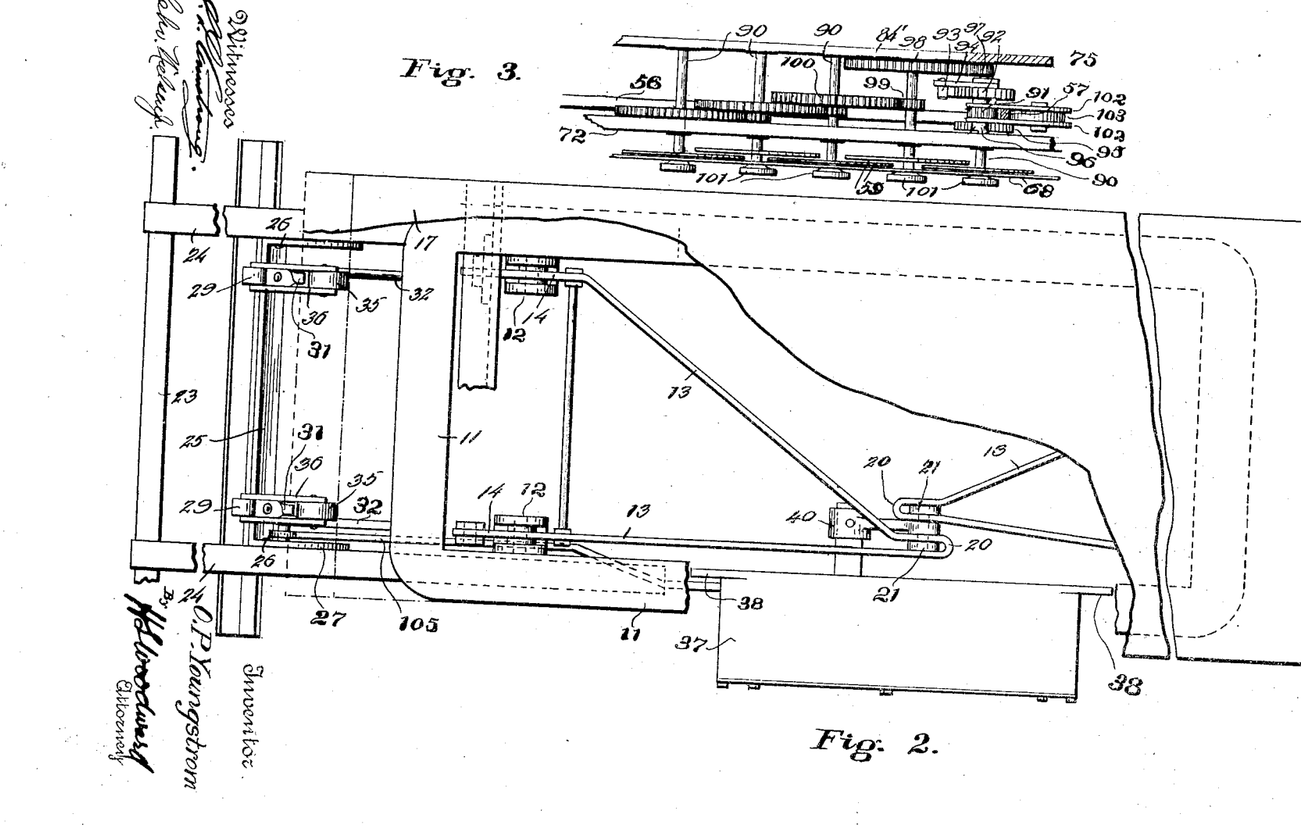
Fig. 2 is a top view thereof, with parts broken away.
Fig. 3 is a fragmentary top view of the registering mechanism showing the dials and gearing therebetween.
Figure 4:
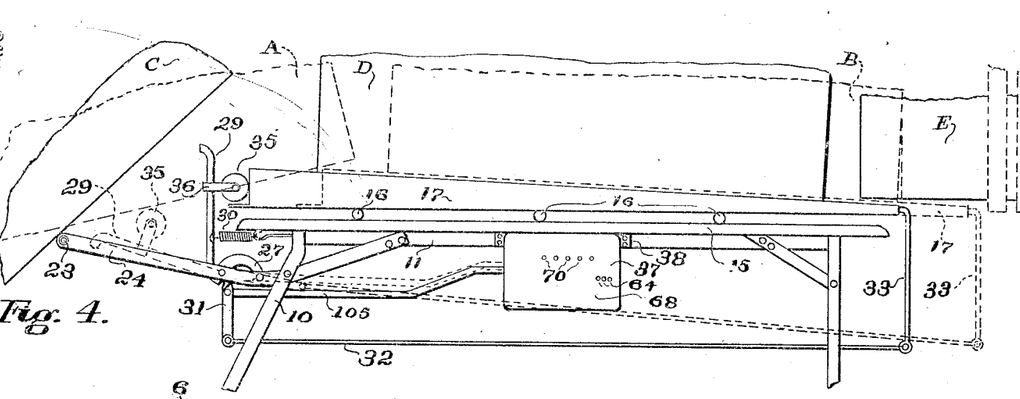
Fig. 4 is a view similar to Fig. 1 showing the device in use.

The right hand end of the scale as shown in Figs. 1 and 2 will be termed the receiving end, while the left hand end will be termed the discharge end. At the discharge end a suitable transverse fender roller 23 is mounted on bracket arms 24 extended from the frame 10 beyond the end of the platform a distance, for the support of bales as described, to prevent them from falling closely adjacent the scale. (See Fig. 4.) At this end of the frame 10, carried by the arms 24, there is pivoted a transverse yoke 25, mounted on suitable trunnions 26 at each side of the frame, and having a stop arm 27 positioned to engage a lug 28 suitably located on the frame for the purpose of checking pivotal movement of the yoke at one limit. This yoke carries upstanding bale engaging operating levers 29, extending a distance above the platforms 15 and 17, a spring 30 being connected with one of the levers and the frame 10, under tension to hold the levers yieldably in position at the upper limit of their movement, the arm 27 then being engaged against the lug 28. Each lever 29 has an extension 31, below the yoke 25 to which there is connected a link 32, extending toward the opposite end of the scale, and attached to a suitable arm 33 projecting downwardly from the sliding platform 17. (See Fig. 4.) The platform 15 may be suitably slotted to permit movement of the arm 33 as desired, or the arm 33 may be located a sufficient distance outwardly of the platform 15 to permit the necessary movement without obstruction. The platform 17 is inclined downwardly at its upper side, from the discharge end toward the receiving end of the scale, and at its high or discharge end normally sets closely over the adjacent end of the platform 15. The levers 29 are located a distance outwardly from the discharge ends of the platforms 17 and 15, and have rollers 35 mounted thereon to initially bear against the discharge end of the platform 17, the rollers being carried by suitable arms 36 extended from the levers 29.

It will be seen that by this construction of the platforms and the connections between the sliding platform and levers 29, with the parts in the position shown in Figs. 1 and 2, and with the receiving end of the device disposed in position to receive bales as discharged from a baler, (see Fig. 4) when a succession of bales are being passed across the scale, each being pushed by the next one behind, as a bale, A, passes over the arms 29, the sliding platform 17 is forced forwardly and under the following bale, B, as dotted, and as soon as the discharged bale C, clears the arms 29, the spring 30 returns the arms to initial position, which, through the agency of the link 32 draws the sliding platform 17 inwardly upon the scale, thus separating the bale D thereon from the following bale E, and keeping it entirely free to be individually weighed. The inclination of the upper surface of the platform 17 causes it to lie clear of an approaching bale when extending slightly over the platform. The short brackets 36 carrying the rollers 35 insure that the arms 29 will be forced downwardly to the fullest extent, as bales leave the platform of the scale, thus giving ample movement to the sliding platform 17, and also supplying ample force to operate the registering mechanism.

The scale balance and registering mechanism are inclosed in a small housing 37 having ears 38 attached to one of the stringers 11, and includes a main scale lever 40 with (which the links 21 have knife edge connections 41), secured upon the end of a suitable shaft 42 mounted revolubly in the housing 37 at the lower side adjacent one end, and projected through the rear side thereof. A bearing 43 is formed in the rear side of the housing 37 to support the shaft 42, and a bearing block 44 is secured upon the floor of the housing by means of bolts 45 to support the forward end of this shaft. At the outer end of the shaft 42 and within the housing 37 there is secured an upwardly extending spring balance arm 46 including a terminal cylindrical stud 47 smooth at its outer part and threaded at its base, upon which there is slidable a spring anchor yoke block 48. This yoke is U-shaped in front elevation, and both arms are apertured to receive the stud 47. On both sides of the lower arm of the yoke 48 nuts 50 are engaged on the threads of the stud. Suitably engaged with the upper arm of the yoke 48 there is a spring 51 of sufficient strength, connected to a stud 52 in the top of the housing 37. This stud may be threaded and a peripherally grooved nut 53 engaged thereon in the groove of which the hook end of the spring may rest. The arm 46 has an enlarged base 54 having a vertical planiform front face 55 to the rear of and extending above the shaft 42 and located before the block 44. The shaft 42 is tenoned at its forward end and on the shaft outwardly of the face 55 there is pivoted a scale beam 56 of suitable length and having connected to its outer end a vertically reciprocable rack 57, meshed with a gear 91, the first of a train of gears 59, whereby movement of the scale beam with the lever 40 will operate the indicator wheels 60 to denote the weight producing such a degree of movement. In order to effect movement of the beam 56 a lever 60 is pivoted upon the base 54 against the face 55, a strike lug 61 being provided on the base 54 to engage the under side of the lever. This lever normally extends in the same direction as the scale beam, and has one end bent outwardly and provided with a threaded aperture over the beam 56 in which there is engaged a set screw 62 bearing upon the beam to move the beam under downward oscillation of the lever 60. A suitable spring 63 is coengaged between this last mentioned lever and the base 54 whereby the lever is held yieldably against the lug 61. A spring 64 is also coengaged between the outer end portion of the lever and the scale beam tending to hold the scale beam against the end of the set screw 62, but permitting movement of the beam away from the screw at times.

The housing 37 is so constructed that it may contain a bale counter, weight recording wheels, the operating mechanism for these parts, and controlling devices by which the recording operations are timed to accord with the movements of materials being weighed.

The housing comprises a casting having suitable vertical and horizontal sides 65 and 66, and a back wall 67 vertical and planiform. The housing is closed at the front side by a thin plate 68, having suitable apertures 69 and 70 for viewing the numbers on the dials of the bale counter and the weight recording devices, and upon the upper sides and the right hand side of the casting mentioned, lugs 71 are formed spaced a short distance back from the front of the housing, to which there is secured a vertical frame plate 72, having suitable bearings 73, 74 formed therein for support of the recording devices to be described. A second frame piece 75 is secured upon the inner side of the plate 72, extending rearwardly a distance, and thence downwardly in parallel with the plate 72, being provided with bearings 76 therein, alined with the bearing 73 of the plate 72. The plate 72 also serves to support certain other shafts, as will be described.

A counter mechanism 80 is provided, which may be of any ordinary construction, including the dial wheels 81, the shaft elements of which may be mounted in the bearings 74 of the plate 72, before mentioned. The counter mechanism preferably includes a lever 82, oscillation of which will operate the counter mechanism. There are a number of mechanisms of this character available for such use, and therefore the details of the counter mechanism will not be further described.

Figures 6, 7:
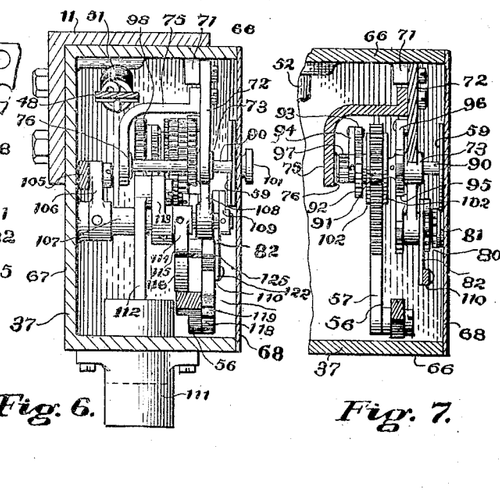
Fig. 6 is a detail cross sectional view of the register device on line 6—6 of Fig. 5.
Fig. 7 is a similar view on the line 7—7 of Fig. 5.
Figures 8, 12:
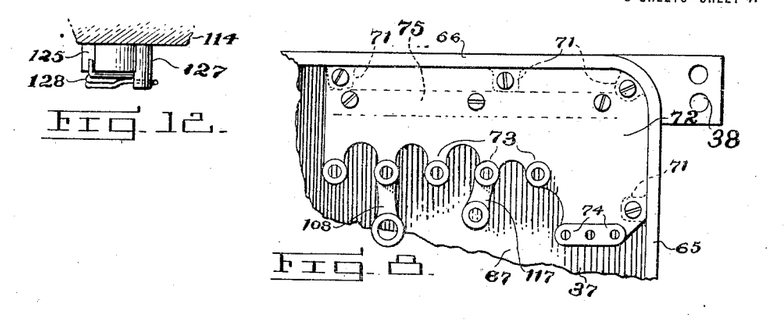
Fig. 8 is a fragmentary detail of the housing 37 and frame for the register mechanism.
Fig. 12 is a detail top view of the spring tumbler in the register.
Figures 9, 10, 11:
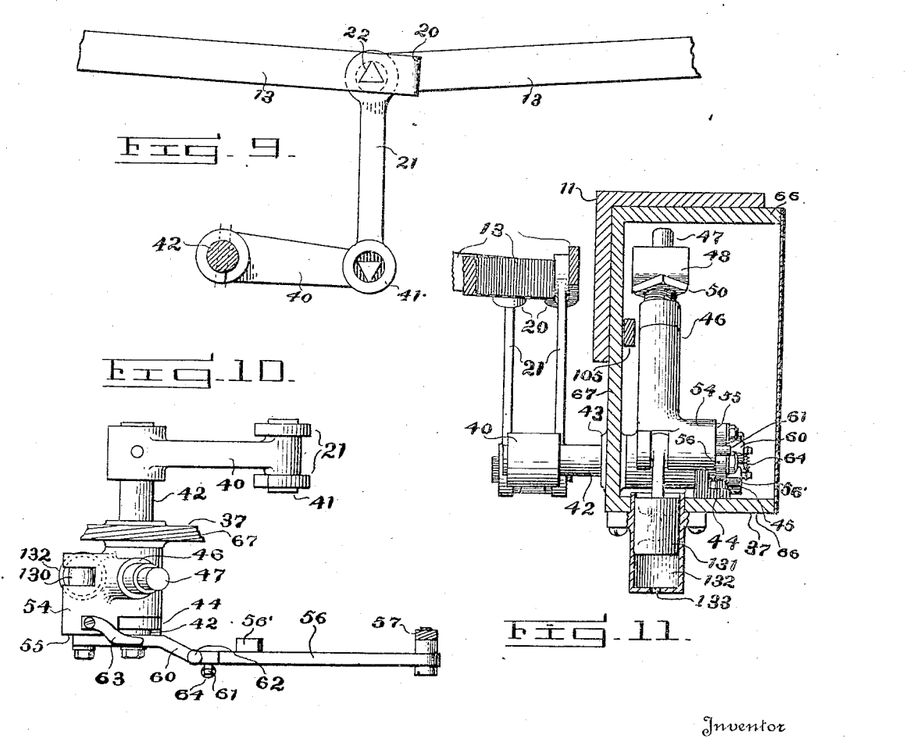
Fig. 9 is a detail of the connection between the platform levers and the register mechanism.
Fig. 10 is a top view thereof and of the scale beam construction.
Fig. 11 is an elevation thereof, from the left.
Figure 13:
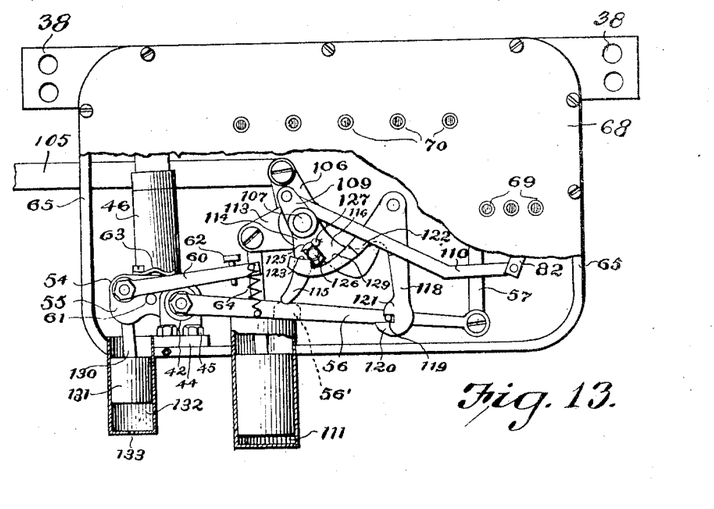
Fig. 13 is a front view of the register showing the control mechanism in normal initial position.

The registering device in the present construction (see Figs. 3 and 7) comprises a plurality of equally spaced similar shafts 90 mounted revolubly in the bearings 73—76 of the plates 72 and 75, all of these shafts having dial plates or wheels 60 thereon before the plate 72. The first of these shafts—at the right—is provided with a gear 91 revoluble on the shaft and meshed with the rack 57. The gear has a ratchet wheel 92 secured thereto with which there is engaged a ratchet 93 carried by a suitable arm 94 secured upon the shaft. The shaft also has secured thereto the second ratchet wheel 95, a pawl 96 carried by the plate 72, engaging it to hold the shaft against reverse rotation. At its inner end the first shaft is provided with a small gear 97 meshed with a large gear 98 carried by the second shaft 90, which in turn has a similar small gear 99 meshed with a large gear 100 on the third shaft, the gear train being continued in this manner to all of the shafts. The proportions of all the parts and numbering of the dial wheels 55 will be readily understood by those familiar with the art. Each of the shafts is provided with a hand knob 101 outwardly of the housing plate 68 for resetting of the device. To hold the rack 53 properly meshed with the gear 91, a plate 102 is mounted revolubly on the shaft 90 at each side of the gear 91, having guide wheels 103 mounted revolubly therebetween at their outer part positioned to bear against the outer side of the rack 53 and hold it snugly against the gear 91, and in alinement therewith, the back of the rack being borne upon by one or both of the wheels.

Connected to the downwardly extending arms 31 of the operating levers 29 before described, there is a control rod 105, which is extended through a suitable opening in the left hand end of the housing 37, close to the rear wall 67 thereof, and connected to an arm 106 on a rock shaft 107 mounted in a suitable bearing on the back wall 67 and on an arm 108, extended downwardly from the plate 72. The shaft 107 is tenoned at its outer end where it engages in the arm 108. On the outer end of the shaft 107, outwardly of the arm 108, there is engaged an arm 109, between which and the lever 82 a suitable link 110 is extended and connected. Thus, on each operation of the lever 29 by a bale leaving the scale, the counter device 80 will be operated to register a bale.

In the lower part of the housing 37 a large dash pot 111 is mounted, the piston of which is connected by the link 112 to an arm 113 fixed upon a larger part of the shaft 107 at its intermediate part. The effect of this connection is to cause the return movement of the lever 29 to initial position to be retarded, after it has been once depressed by a bale. Secured upon the shaft 107 next adjacent the arm 113, there is a cam 114, having arms 115 and 116, alined with and constructed to engage a lug 56' on the inner side of the scale beam 56 at opposite limits of movement of the cam under rocking of the shaft 107.

Figure 5:
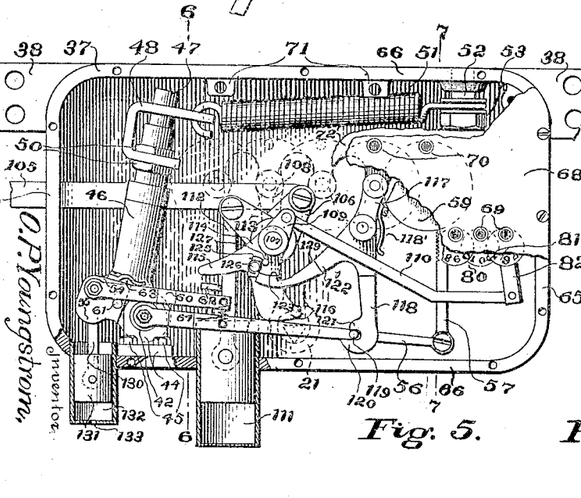
Fig. 5 is a detail front view of the register assembly with parts broken away to show the controlling devices.

In the construction shown, the control rod 105 is moved to the right by depression of the lever 29, and Fig. 5 of the drawings shows the mechanism in position shortly after the lever 29 has been depressed to the fullest extent, and has begun its return movement. In this way, the left hand arm 115 of the cam serves to engage and bear the beam 56 to initial position when the levers 29 are in normal initial position, and the arm 116 of the cam serves to engage the beam 56 when the levers 29 are depressed. The last mentioned arm of the cam is formed with a concentric portion arranged to bear upon the beam 56 and maintain it in initial position before the cam has reached the limit of its movement under depression of the levers 29, for a purpose which will presently become apparent. Pivoted suitably upon the lower end of an arm 117 formed upon the plate 72 to the right of the arm 108 a distance, there is a keeper hook 118, positioned to lie closely beside the beam 56, which is provided with a lug 119 projecting forwardly therefrom to engage in the hook when the beam is at the lower limit of its movement. The hook is provided with a long bill 120 at the lower side, and a short bill 121 at the upper side, between which the lug is loosely received, as illustrated in Fig. 5. The hook is provided with a cam arm 122, extended closely before the cam 114, this arm being provided with an outer upper face 123 which is concentric with the shaft 107 when the bill 121 of the hook 118 is displaced sufficiently to permit the lug 119 to move upwardly without obstruction. Mounted on the cam 114 there is a tumbler 125, of oblong shape, as viewed from the front of the device, mounted upon a suitable pin 126 in such a position on the cam that when the hook 118 is in engagement with the lug 119 at times, the tumbler may lie over the face 123 with its major dimension approximately parallel thereto, or may be disposed with its major dimension at right angles to the face 123 so as to bear the arm 122 downwardly. In the last mentioned position the tumbler may lie at times with one of its projecting end portions engaged against the extremity of the arm 122 as shown in Fig. 5, and a pin 127 is provided on the cam to engage the opposite end portion of the tumbler to prevent its rotation when bearing against the end of the arm 122. A spring 126 is engaged with the tumbler and the pin 127, under tension tending to turn the tumbler into engagement with the pin 127. The arm 122 is provided on its inner part with an offset 129, spaced outwardly of the face 123 from the shaft 107, the face 123 being of such an extent that when the tumbler has an end portion engaged thereon to depress the arm 122, the tumbler will be moved inwardly under operation of the levers 29 and reach the offset 129 just before the levers 29 reach their initial position, thus allowing the hook 118 to return to proper position to engage the lugs 119 on the beams 56 as soon as the arms 115 of the cam has depressed the beam 56 to initial position. The extent of the concentric part of the arm 116 is sufficient to maintain the beam 56 in position for the lug 119 to enter the hook 118 until the latter engages the lug.

The base 54 of the balance arm 46 is extended sufficiently to permit the pivotal mounting of a connecting rod 130 thereon at the left hand side, which is connected to a piston 131 in the dash pot 132 mounted in the bottom of the housing 37 immediately adjacent the left hand end. This dash pot is provided with a small escape opening 133, and any well known means for regulating the escape of air may be used on this dash pot, as well as on the one 111, if found desirable. The dash pot 132 serves to retard the movement of the balance arm so that it will not pass beyond the line at which tension of the spring 51 balances the weight on the scales, there being no resistance offered by the air in the dash pots to slow movement of the arms, and only such movement is resisted which tends to create sufficient momentum for the arms to pass beyond the line of equilibrium.

In operation, the scale being set up adjacent the discharge end 135 of a baler, with the receiving end of a platform 17 slightly below the level at which the bales will project from the machine under a portion of their movement initially, which is to say that the bale should be spaced a distance above the platform 17 (after they have been projected a distance from the baler), after the first bale has been pressed outwardly until its rear end is just within the receiving end of the platform 17, the levers 29 are manually operated once, by being depressed to their fullest extent and then released, after which the device will operate automatically without further attention, as the bales are discharged from the baling machine. On this initial operation the platform 17 is pressed toward the baler, from which a second bale will be projecting a distance, so that the first bale will be held against return to the baler and the platform 17 thrust outwardly thereunder. As the lever 29 returns to initial position the platform 17 is moved sufficiently to clear the bale following, which is fully engaged on the platform, by the time the tumbler has moved the arm 22 sufficiently for the hook 118 to disengage the lug 119. It should be noted that there is nothing which prevents the movement of the balance arm 46 at any time, with the exception that the small spring 64, coengaged between the beam 56 and lever 60, operates in that way to some extent. The cam arm 116 is so constructed that at the time the hook 118 is disengaged from the lug 119, the cam is still bearing upon the beam 56, but immediately after clearing of the hook, upward movement of the arm 116 permits the beam 56 to rise, under action of the spring 64, the balance arm 46 by this time having come to a rest at the point of equilibrium, or nearly so, depending on the effect of the spring 64, the beam 56 moving upwardly until it engages the screw 62. In a very short interval, the arm 115 again engages the beam 56, but not before the beam 56 has had time to move the indicator wheel to record the weight of the bale upon the scale, and the beam 56 is pressed downwardly to initial position again, at which time the tumbler 125 passes on to the offset portion 129 of the arm 122 carried by the hook 118, which permits the hook to return to engagement with the lug 119, at which time the levers 29 will be in initial position ready for engagement by the bale as it is pushed from the platform by a following bale. The recording mechanism will thus be locked securely while a bale is being pushed from the platform, the following bale being engaged sufficiently upon the platform to be supported thereby when a preceding bale is discharged by falling as indicated at C in Fig. 4, its movement on to the fender 23 having served to depress the levers 29 and bear the platform 17 forwardly under the following bale, and when it falls as indicated the following bale is drawn away from the next one behind it, from which the platform 17 is at the same time cleared, and the operation of the mechanism as before described is then repeated.

It is desirable that the hook 118 be engaged by a spring mounted as indicated at 118', Fig. 5, tending to bear the hook into engaged position.

Figures 14, 15, 16, 17:
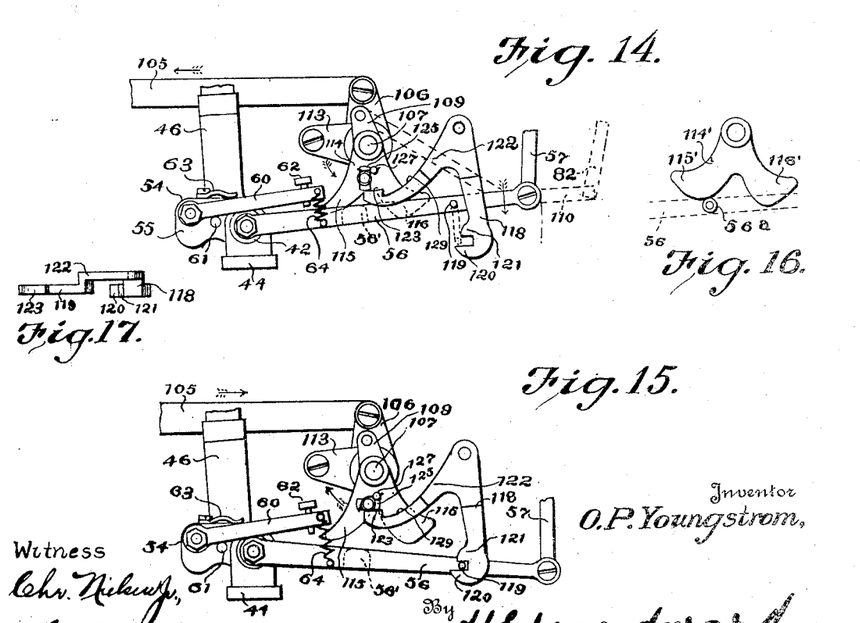
Fig. 14 is a similar view of the control mechanism in operation, as appearing when returning to initial position immediately after weighing, and when the scale beam is being borne downward to be locked.
Fig. 15 is a similar view showing the same parts when moving from initial position, as when a bale is bearing the levers 29 downward.
Fig. 16 is a detail of a desirable form of the cam 114.
Fig. 17 is a detail top view of the locking hook.

It may be found desirable to provide a wiper roller on the inner side of the scale beam 56, in place of the lug 56' described, such a wiper being indicated at 56ª, in Fig. 16. The cam device may also be constructed as shown in this view, designated 114', with the arm 115', corresponding to the arm 115, formed with an extended concentric portion, in the same way as the arm 116 before described.

It should also be noted that in order for the scale beam 56 to clear the arm 122 and hook 118, the outer parts of these members are offset, as indicated. The necessity for this offset construction may of course be obviated by slight mechanical changes, but is necessitated in the present instance, by reason of the fact that the pivoted part of the hook 118 is located directly over the beam 56. On account of this offset construction in the arm 122, it is necessary that the tumbler 125 be extended considerably beyond the cam 114, in order to properly engage the parts 123 and 129.

It will be seen that a comparatively simple construction is provided for attaining very desirable functions in connection with scales and the registering and recording of the weight of articles, and apparatus constructed in accordance with this invention has been found to operate in a very highly satisfactory manner.

As it is a custom in weighing, to refer to articles or a number of articles weighed at one time as a "draft," that term will be in the claims to designate matter being weighed, for convenience. An instance of the use of the term draft is in the weighing of sugar by the customs officials at the port of New York.

What is claimed is:

1. In a scale, the combination including a weighing platform support, a sliding platform thereon, an article-controlled lever disposed at one side of the scale, and connections between the lever and said sliding platform for movement of the sliding platform.

2. In a scale, platform beams, a balance lever, a separately movable scale beam, resilient connections between the lever and scale beam, means to limit relative movement of the lever and scale beam in one direction, a registering device operatively associated with the beam, and means to move and hold the scale beam against action of the spring at zero position while a weight is on the scale.

3. In a scale, a balance lever, a scale beam separately movable, means on the lever to positively engage the beam under movement of the lever in one direction, resilient means connecting lever and beam tending to hold them so co-engaged, register connections with the beam, and means to positively move the beam to a predetermined initial position.

4. In a scale, a balance lever, a separately movable scale beam, means on the lever to positively engage the beam under movement of the lever in one direction, resilient yielding means to hold the parts so engaged, register connections with the beam, an article-operated lever at the discharge side of the scale, and operative connections between the last named lever and scale beam to move the beam to zero position while an article is being discharged.

5. In a scale, a balance lever, a separately movable scale beam, resilient connections and a stop therebetween, means to move the beam relatively to the lever to zero position while a weight is on the scale, and a latch device to hold the beam releasably at zero position.

6. In a scale, a scale beam, a balance lever including two arms, connections between one arm and the scale beam, a balance device, connections between the other arm and the balance device, a pivoted separately movable beam, a lever pivoted on the said balance lever, and having a part disposed in the path of the last named beam, resilient connections between the last named lever and beam, and means to positively move the last named beam to zero position.

7. In an automatic recording scale, a registering device, a balance device, an element movable relatively thereto at times, connected to the balance device and operatively connected with the registering device, means to lock the registering device and draft controlled means to move the locking means into disengaged position.

8. In an automatic recording scale, a draft receiving element, a balance device associated therewith, a relatively movable member connected thereto, a registering device operatively connected with said movable member, a retarding device operatively associated with the registering device, releasable means to lock said movable element of the balance device in initial position, and means to move said movable element to initial position positively.

9. In an apparatus of the character described a draft receiving element, balance means associated therewith including a movable arm, a registering device including a scale beam, resilient connections between the scale beam and said arm, means to limit the speed of movement of said arm, means to lock said scale beam in initial position, means to move said scale beam positively to initial position, and means to limit the speed of movement of said scale beam.

10. In an apparatus of the character described a draft receiving element, a balance device connected therewith including a movable arm, a registering device including a reciprocable element, operative connections between the reciprocable element and said arm, yieldable in one direction, a dash pot retarding device connected with said arm, means to lock said reciprocable element in initial position, means to disengage the locking means, a resetting device associated with the last named means operatively, including a draft controlled element, said resetting means being constructed and arranged to operate at the unlocking of said registering device, and including a timing means.

11. In a device of the character described, a draft receiving element, a balance device connected therewith, a registering device operatively connected with the balance device, and operative under balancing action of the balance device, means to limit the speed of movement of operative parts in the mechanism, means to lock the registering device in initial position, and means to move the device to initial position positively.

12. In an apparatus of the character described, an oscillatable arm, a scale beam movable relatively thereto, yielding means to hold the scale beam in a fixed relation to the oscillatable arm, a detent operatively associated with said beam to prevent movement thereof by said yielding means, a rock shaft, a cam on the shaft, an element on the beam to be engaged by the cam, said cam being constructed to bear said beam to initial position in a part of its movement in one direction, and being constructed to hold said beam in initial position in a part of its movement adjacent the limit of its movement, in the opposite direction, means on said cam to operate under movement of the cam in one direction to disengage said detent, and inoperative under movement of the cam in the opposite direction, and means to rock said rock shaft.

13. In an apparatus of the character described, an oscillatable arm, a scale beam movable relatively thereto, yielding means to hold the scale beam in a fixed relation to the oscillatable arm, a detent operatively associated with said beam to prevent movement thereof by said yielding means, a rock shaft, a cam on the shaft, an element on the beam to be engaged by the cam, said cam being constructed to bear said beam to initial position in a part of its movement near one limit, and being constructed to hold said beam in initial position in a part of its movement adjacent the opposite limit of its movement, means on said cam to operate under movement of the cam in one direction to disengage said detent, and inoperative under movement of the cam in the opposite direction, means to limit the speed of movement of said rock shaft, and means to rock said rock shaft.

14. A scale construction comprising a weighing device including a slidable draft receiving element, an operating lever adjacent the draft receiving element, connections between the lever and draft receiving element operative to advance the receiving element in the direction of approach of drafts.

15. A scale construction including a draft receiving element, a balance lever, means to govern the speed of movement of the balance lever, a separately movable recording beam on said lever, yielding means to hold the beam and lever in predetermined relation, a cam device operatively associated with the scale beam having portions to engage and hold the lever at initial positions when the cam is adjacent opposite limits of its movement, and constructed to permit free full operative movement of the beam when the cam is at an intermediate position, said cam having intermediate portions to bear the beam to initial position and parts to bear upon and retard operative movement of the beam during movement of the cam in one direction, means to limit the speed of movement of the cam and draft controlled means to operate the cam.

16. In apparatus for the purposes indicated, a draft receiving element, a scale beam operatively connected therewith, a cam device having eccentric faces divergent from a point of minimum radius, and having concentric terminal faces at opposite sides of maximum radius, an element on the beam alined with the cam, said cam being positioned to engage the beam in the direction of draft-impelled movement, a speed retarding device engaged with the cam, means to hold the beam in initial position during movement of the cam in one direction, and means to operate the cam including an element adjacent the draft receiving element.

In testimony whereof I have affixed my signature in presence of two witnesses.

OSCAR P. YOUNGSTROM.

Witnesses:
W. F. SPRAGUE,
G. T. KINSEY.

Copies of this patent may be obtained for five cents each, by addressing the "Commissioner of Patents, Washington, D. C."